Jan. 28, 1969     L. L. GIUDICI     3,424,606
LAMP PHOSPHOR ADHERENCE
Filed June 16, 1966
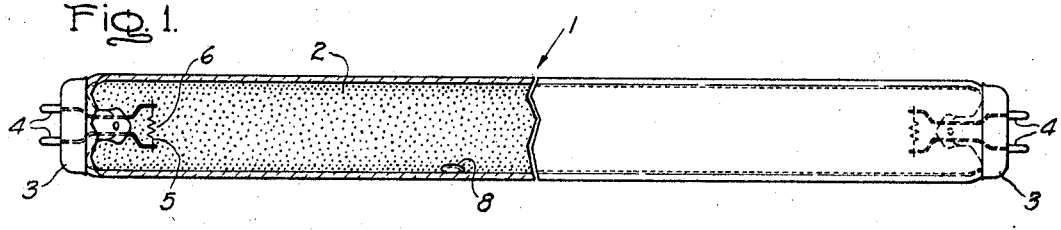
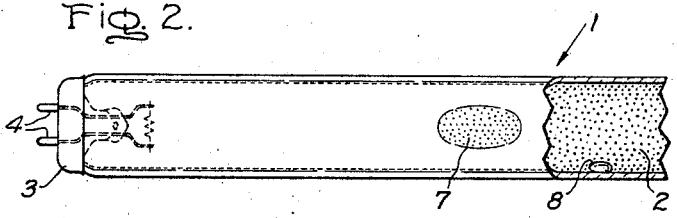
Inventor:
Livio L. Giudici
by *Richard H. Burgess*
His Attorney United States Patent Office 3,424,606
Patented Jan. 28, 1969

3,424,606
LAMP PHOSPHOR ADHERENCE
Livio L. Giudici, Mentor, Ohio, assignor to General
Electric Company, a corporation of New York
Filed June 16, 1966, Ser. No. 558,093
U.S. Cl. 117—33.5                6 Claims
Int. Cl. C09k 1/00; F21k 2/00; B05c 3/06

ABSTRACT OF THE DISCLOSURE

In the making of fluorescent tubes, it has been found that the bonding of the halophosphate phosphors to the glass is improved with the use of barium nitrate and ammonium nitrate as the permanent bonding agent. This suspension is applied to the glass with a temporary organic binder which is burned off in the lehr.

---

This invention relates to a means for improving the adherence of lamp phosphors in fluorescent lamps. More particularly, it relates to a process, a phosphor suspension, and lamps produced by such process whereby adherence of the phosphor to the lamp is improved and light output and maintenance of light output are not significantly harmed.

Phosphor coatings are normally provided in fluorescent lamps by flushing the lamp with a suspension of phosphor particles, drying the suspension and then lehring the lamp tube. Although fluorescent lamps are not always made in the form of straight tubes, the word "tube" will be used herein to refer generally to the glass shell of the fluorescent lamp on the inside of which a phosphor coating is provided. The suspension may be in either water or an organic solvent, in either case along with a temporary organic binder, and the initial drying step is for the purpose of removing gross amounts of water or organic solvents. This generally leaves a phosphor film adhering to the inside of the glass lamp envelope by means of a temporary organic binder. Lehring removes final amounts of water or organic solvent in addition to burning out the temporary organic binder.

Due to the tendency of the fluorescent coatings to chip or flake off the inside of the envelope in spots during lamp making, transportation or use, various means have been proposed in the past for improving the adherence of the phosphor coating to the lamp wall. To be useful in a fluorescent lamp an adherence additive must not react deleteriously with the inner lamp environment, and should not absorb ultraviolet or visible radiation unproductively, in other words, unless the adherence additive is as efficient a light producer as the phosphor itself, it should be a good reflector of, or transparent to, ultraviolet and visible radiation.

Some success has been achieved in promoting adherence of phosphors which are applied to the lamp envelope as suspensions in organic systems such as solutions of nitrocellulose in butyl acetate and naphtha along with various additives. However, such additives as finely divided silica, for example, either fail to promote adherence or reduce lamp efficiency, brightness or maintenance when used in aqueous suspensions of phosphor with water-soluble temporary organic binders. Also, none of the adherence-promoting additives which have been proposed to date for use in conjunction with aqueous suspension have been completely satisfactory.

A quite useful means for improving the adherence of phosphors in fluorescent lamps has been described and claimed in copending application Ser. No. 542,582, filed Apr. 14, 1966 in the names of David H. Beaumont and Arnold I. Friedman and assigned to the assignee of the present invention. The disclosure of that application is hereby incorporated into the present application by reference. That invention involves the use of $Ba(NO_3)_2$ added to the aqueous suspension of phosphor to act as an adherence promoter upon lehring of the lamp tube. However, although that invention is a significant improvement over the prior art, its utilization generally requires a slightly higher lehring temperature than is needed when the $Ba(NO_3)_2$ is not used, due in part to the apparent necessity for exceeding the melting temperature of $Ba(NO_3)_2$ of about 592° C. by a sufficient temperature difference to fully obtain the advantages of the invention. Also, adherence produced by that invention of Beaumont et al. is not perfect and further improvements in adherence are quite desirable.

Accordingly, it is an object of the present invention to provide a further improved means of increasing the adherence of phosphors in fluorescent lamps as an improvement on the above-cited application of Beaumont et al.

Another object of the invention is to provide a method for producing phosphor coatings of improved adherence in fluorescent lamp tubes more readily and at lower temperatures than can be done according to the teachings of Beaumont et al.

Further objects and advantages of the invention will appear from the following detailed description of species thereof and from the accompanying drawing.

FIG. 1 of the drawing is a linear tubular fluorescent lamp partly in section and illustrative of the invention.

FIG. 2 is a schematic representative of an end portion of a linear tubular fluorescent lamp including an area characteristic of defects occasionally found in lamps of the prior art after resilient impacting of the lamp wall by an external object.

Briefly stated, according to one aspect of the present invention, means are provided for increasing the adherence of phosphor coatings on inner surfaces of glass lamp walls by a process utilizing an aqueous suspension of a halophosphate phosphor such as calcium halophosphate phosphor which may be activated with antimony and manganese wherein, in addition to the temporary organic binder used to hold the phosphor in place until the lehring process, a relatively permanent adherence additive, namely barium nitrate, $Ba(NO_3)_2$, is used along with ammonium nitrate, $NH_4NO_3$, which acts to further promote adherence and to facilitate lehring. The $Ba(NO_3)_2$ is added in a form such that it will be in solution in the aqueous phase of the suspension, and should be within the limits of 0.05–0.3 weight percent of the amount of phosphor present on a dry basis. (Percentages herein are by weight except where indicated otherwise.) When the temporary organic adherence additive is carboxymethyl cellulose (CMC), the $Ba(NO_3)_2$ is preferably present in amount of 0.07–0.2%, based on the amount of dry phosphor. The $NH_4NO_3$ may be present in the aqueous phase of the suspension from a small but effective amount to improve adherence such as about 0.1% to about 2.5% based on the amount of dry phosphor, and 0.25–1% seems to be preferable to achieve maximum adherence with minimum adverse effect on light output. The carboxymethyl cellulose can be present in small but effective amounts such as about ½% on the same basis, and the pH of the suspension should be neutral or slightly acid, preferably in the range of 6 to 7. Slight alkalinity can be tolerated if flocculation does not result, but alkalinity is not preferred for long continuous runs where the $Ba(NO_3)_2$ might not be sufficiently stable. Under such conditions, the optimum $Ba(NO_3)_2$ concentration appears to be about 0.15%, and the optimum $NH_4NO_3$ is about 0.5%.

Turning now to the drawing, FIG. 1 illustrates one type of fluorescent lamp with which the present invention may be used. This lamp consists of a hermetically sealed linear tubular glass envelope 1 coated on its inside surface with a powdered phosphor 2 which converts the ultraviolet energy of a mercury arc established through the center of the tube into visible light as it is absorbed by the phosphor layer 2 during operation of the lamp. Mercury droplet 8 is vaporized during operation of the lamp. Bases 3 at each end of the lamp support electrical leads 4 which are electrically connected with electrodes 5 at each end of the lamp. The electrodes are coated with electron-emission-promoting materials 6 such as mixtures of oxides containing barium oxide to facilitate operation of the lamp.

FIG. 2 illustrates an end portion of a fluorescent lamp such as the one shown in FIG. 1 after it has been subjected to a test known in the art as a "Snap Test" to determine the adherence of the powder phosphor coating on the inside wall of the lamp. When the glass wall of the lamp is resiliently impacted with a high enough force, low magnitude wave motion will be set up over a short distance in the glass wall causing portions of the phosphor layer to flake off in the vicinity of the impact. Snap Test results are indicative of the ability of lamps to withstand handling during manufacture. The present invention provides a means for greatly improving the resistance to this effect relative to lamps made according to the prior art. The improvement apparently takes the form of increased adherence of phosphor particles to each other and to the glass wall of the lamp tube.

The $NH_4NO_3$ apparently enhances oxidation of the temporary organic binder during lehring, which permits lower lehring temperatures to be used effectively. Other effects enhancing adherence may include slightly lowering the effective melting temperature of the $Ba(NO_3)_2$ and retarding any conversion of $Ba(NO_3)_2$ to other less desirable compounds.

Halophosphate phosphors for use in lamps, such as calcium halophosphate phosphor activated with antimony and manganese, may be produced by methods known in the prior art. After the phosphors are produced by firing, they are generally milled to disperse agglomerates and then washed to remove deleterious impurities, can be classified according to size, and are cleaned of essentially all residual material left over from the milling and washing. Milling can be done in aqueous suspension using a suspending medium such as polyvinyl methacrylate-maleic anhydride, and washing can be done with ammoniated ethylenediamine tetracetic acid (EDTA) according to Patent 3,047,512—Martyny or by use of sulfamic acid, $NH_2SO_3H$, as taught in patent application Ser. No. 441,317, filed Mar. 19, 1965 in the names of Friedman and Beaumont, both of which are assigned to the assignee of the present application.

It is now considered that the preferable lehring procedure with $Ba(NO_3)_2$ adherence additives in a suspension using carboxymethyl cellulose as the temporary organic binder is about 625 to 650° C. for times from 90 to 170 seconds. Much lower temperatures have been associated with considerable losses in brightness of the lamps produced. $NH_4NO_3$ used in accordance with the invention permits lehring at lower temperatures which are inherently less demanding on the furnace equipment. It has been noted in the past that phosphor which has been washed with sulfamic acid as taught by the above-identified Friedman et al. application requires higher lehring temperatures than phosphor washed with ammoniated ethylenediamine tetracetic acid in accordance with the above-identified Martyny patent. Utilization of $NH_4NO_3$ in accordance with the present invention increases the flexibility of process parameter design using material washed with sulfamic acid.

Other satisfactory processes for producing phosphors and suspensions are known in the art and are set forth in the above-identified Beaumont et al. application and will not be repeated here.

When used with carboxymethyl cellulose as the temporary organic binder, $NH_4NO_3$ is found to cause flocculation of the suspension when the pH of the suspension is excessively basic, such as from 9 to 11. Moreover, as explained in detail in the above-identified Beaumont et al. application, there are other reasons for avoiding excessively basic suspensions, and strongly acidic suspensions are also to be avoided for reasons including the prevention of some attack or dissolution of the phosphor itself producing soluble phosphates which are harmful to lehring and to light production by the resulting lamps. Therefore, as described by Beaumont et al., when carboxymethyl cellulose is used as the temporary organic binder, it is desirable to obtain it from acid carboxymethyl cellulose treated with ammonia to produce a water solution and then boiled to remove excess ammonia to bring the pH to the desired level of about 6 to 7.

This boiled carboxymethyl cellulose in approximately a 2% solution in water is added to the cleaned phosphor to a level of about ½% carboxymethyl cellulose based on the dry phosphor content. $Ba(NO_3)_2$ is then added preferably in the form of a 5% solution in water to the desired level. The preferred amount of $Ba(NO_3)_2$ is about 0.15% as compared with the total amount of phosphors present on a dry basis. Less than about 0.05–0.07%, depending on circumstances, does not substantially give the desired effects of adherence, and greater than about 0.2–0.3%, again depending on circumstances, results in a decrease in brightness. This might possibly be caused at least partially by trapping of carbon from the residue of the temporary organic binder as the excess $Ba(NO_3)_2$ melts. When carboxymethyl cellulose is used, the preferred $Ba(NO_3)_2$ content is in the range of 0.07–0.2%. $NH_4NO_3$ is added in the desired amounts preferably as a 15% to 25% water solution to the phosphor suspension. Wetting agents and bactericides may be used when desirable as described by Beaumont et al.

After the preparation as described above, the suspension is preferably thoroughly homogenized by means of a high-speed mixer in order to tear up any undissolved gels of carboxymethyl cellulose which might otherwise leave spots on the bulb wall, and generally to assure homogeneity and the absence of lumps, and then filtered. For use in producing lamps the suspension can then be diluted by adding water such as in amounts equal to the total volume. Other temporary organic binders than carboxymethyl cellulose can be used, including naturally occurring alginates and polymerized ethylene oxide.

The precise lower limit of $NH_4NO_3$ is indefinite—with less than 0.25% $NH_4NO_3$ it becomes increasingly difficult to find the beneficial effects, i.e., lehring is only slightly improved, and adherence improvement approaches that of $Ba(NO_3)_2$ alone. The lower limit appears to be about 0.1% with 0.20% or 0.25% being a practical preferred lower limit. Conversely, the upper limit of $NH_4NO_3$ is more easily found. As more than 1.0% $NH_4NO_3$ is added, two effects are noted. Ease of lehring increases, but the adherence improvement begins to diminish. Thus, the desirable effect of easier lehring is offset by a lessening in phosphor adherence. Above 2.5% of $NH_4NO_3$ the phosphor adherence is worse than with the use of $Ba(NO_3)_2$ alone. This effect on adherence is not fully understood but is connected with the reversal in the type of adherence. Phosphor-to-glass adherence is diminished, and a gain in phosphor-to-phosphor adherence is obtained. This results in the phosphor falling off in sheets when the glass is struck as with the snap tester. The practical limits for $NH_4NO_3$ are 0.1–2.5% with the preferable limits 0.25–1.0% based on the weight of the dry phosphor present.

Comparative snap testing of lamps made in accordance with the present invention, in accordance with the invention of Beaumont et al., and in accordance with the prior art has been performed, and the results are set forth in Table I below for two different sets of experiments. Snap testing, described above in conjunction with FIG. 2, involves resiliently impacting the lamp under controlled conditions and then measuring the diameter of the area of phosphor which has been knocked off, referred to as "Coating-Off." These tests used a length of piano wire for impacting the lamp about 6 inches from each end and at the center. Measurements given herein are the major diameter of the oval bare spot at the center of the lamp. Light output measurements in lumens after 100 hours of lamp operation is also given in Table I. Phosphor tests stated herein were made with lamps of standard cool-white 40-watt design.

TABLE I.—ADHERENCE IMPROVEMENTS

| Suspension | Snap test coating-off(mm.) | Brightness (Lumens) |
|---|---|---|
| Series 1: | | |
| (1) CMC | 121 | |
| (2) CMC+0.15% Ba (NO$_3$)$_2$ | 41 | |
| (3) (2)+1%NH$_4$NO$_3$ | 3 | |
| Series 2: | | |
| (4) CMC+0.15% Ba(NO$_3$)$_2$ | 70 | 3,264 |
| (5) (4)+0.5% NH$_4$NO$_3$ | 19 | 3,269 |
| (6) (4)+1.0% NH$_4$NO$_3$ | 17 | 3,262 |

This effect of the NH$_4$NO$_3$ allows more latitude in lehring temperature and time and tends to eliminate lumen availability, holding lumens constant over a wider fluctuation in lehring temperature. Equally important is its ability to improve phosphor adherence when used in conjunction with the Ba(NO$_3$)$_2$ adherence additive. This adherence improvement is of the order of a three-fold improvement over use of Ba(NO$_3$)$_2$ alone. This can be noted by the Snap Test previously described, where a phosphor suspension containing 0.15% Ba(NO$_3$)$_2$ gives a coating-off area of 45–50 mm. and an identical suspension but with addition of 0.5% NH$_4$NO$_3$ gives a coating-off area of 3–10 mm. This substantial improvement in Snap Test adherence has accounted for a real reduction in lamp shrinkage due to flaked-off phosphor coating as caused by normal handling of the tubes during manufacture.

Table II illustrates the improvement in lehrability associated with the use of NH$_4$NO$_3$ in previously described suspensions containing 0.15% Ba(NO$_3$)$_2$, the phosphors in which had been washed with sulfamic acid. The addition of 0.5–1% NH$_4$NO$_3$ allows lehring at lower temperatures without loss of lamp light output (lumens measured after 100 hours of burning) and tends to make the lehring temperature less critical as to production of optimum lumens. This has been especially noted with phosphors washed with sulfamic acid as previously described, but is also noted with phosphors washed with EDTA but the effect is less dramatic in this case. The noted improvement in adherence is still present even at the lower lehring temperature of 600° C.

TABLE II.—BRIGHTNESS WITH VARYING LEHRING TEMPERATURES

| Suspension | Brightness (Lumens) | |
|---|---|---|
| Series 1 (600° C. Lehr): | | |
| (10) CMC+0.15% Ba(NO$_3$)$_2$ | 3,027 | |
| (11) (10)+1% NH$_4$NO$_3$ | 3,251 | |
| | Test 1 | Test 2 |
| Series 2 (650° C. Lehr): | | |
| (12) CMC | 3,278 | 3,258 |
| (13) CMC+0.15% Ba(NO$_3$)$_2$ | 3,114 | 3,130 |
| (14) (13)+0.5% NH$_4$NO$_3$ | 3,261 | 3,251 |

In order to determine whether the effects of NH$_4$NO$_3$ were unique in giving the advantages of the present invention, other oxidizing agents were substituted for NH$_4$NO$_3$ for the production of phosphor suspensions. These included ammonium perchlorate, NH$_4$ClO$_4$, aluminum nitrate, Al(NO$_3$)$_3$, lead nitrate, Pb(NO$_3$)$_2$, and magnesium nitrate, Mg(NO$_3$)$_2$. None were successful. The NH$_4$ClO$_4$ prevented complete binder burn-out and significantly increased the soluble sodium content of the phosphor coating in the lamp, resulting in a lower lumen level. Al(NO$_3$)$_3$ and Pb(NO$_3$)$_2$ reacted with the carboxymethyl cellulose binder and precipitated out carboxymethyl cellulose salts with resultant flocculation of the suspension. Mg(NO$_3$)$_2$ also prevented complete burn-out of the temporary organic binder during lehring.

What I claim as new and desire to secure by Letters Patent of the United States is:

1. A method of coating a fluorescent lamp tube with phosphor having improved adherence to said tube, said method comprising coating said tube with an aqueous suspension of halophosphate phosphor particles containing, by weight based on the amount of dry phosphor, about 0.05–0.3% Ba(NO$_3$)$_2$ and about 0.1–2.5% NH$_4$NO$_3$ in solution, and a small but effective amount of a temporary organic binder which can be essentially completely removed from the lamp tube on lehring, the suspension having a pH which is acid, neutral or basic, but not so basic as to cause flocculation, drying the coated tube to remove gross amounts of water, and then lehring the tube at temperatures rising to above the melting point of said Ba(NO$_3$)$_2$ to burn out the temporary organic binder and any remaining deleterious water and to effectuate an improved bonding of said phosphor particles to said tube.

2. The process of claim 1 wherein the quantity of Ba(NO$_3$)$_2$ is about 0.07–0.2%, the quantity of NH$_4$NO$_3$ is about 0.25–1%, the temporary organic binder is carboxymethyl cellulose, and the suspension has a pH approximately in the range of 6 to 7.

3. An aqueous suspension of halophosphate phosphor containing, by weight of the dry phosphor content, about 0.05–0.3% Ba(NO$_3$)$_2$ and about 0.1–2.5% NH$_4$NO$_3$ in solution, and a small but effective amount of a temporary organic binder which can be essentially completely removed from a lamp tube in which the suspension has been coated upon lehring, the suspension having a pH which is acid, neutral or basic, but not so basic as to cause flocculation.

4. An aqueous suspension according to claim 3 wherein the quantity of Ba(NO$_3$)$_2$ is about 0.07–0.2%, the quantity of NH$_4$NO$_3$ is about 0.25–1%, the temporary organic binder is carboxymethyl cellulose, and the pH of the suspension is approximately in the range of 6 to 7.

5. A fluorescent lamp containing a coating of halophosphate phosphors of improved adherence which has been applied to the inner wall of the tube of said lamp by a method comprising coating said tube with an aqueous suspension of halophosphate phosphor particles containing, by weight based on the amount of dry phosphor, about 0.05–0.3% Ba(NO$_3$)$_2$ and about 0.1–2.5% NH$_4$NO$_3$ in solution, and a small but effective amount of a temporary organic binder which can be essentially completely removed from the lamp tube on lehring, the suspension having a pH which is acid, neutral or basic, but not so basic as to cause flocculation, drying the coated tube to remove gross amounts of water, and then lehring the tube at temperatures rising to above the melting point of said Ba(NO$_3$)$_2$ to burn out the temporary organic binder and any remaining deleterious water and to effectuate an improved bonding of said phosphor particles to said tube.

6. A fluorescent lamp according to claim 5 wherein the quantity of Ba(NO$_3$)$_2$ is about 0.07–0.2%, the quantity of NH$_4$NO$_3$ is about 0.25–1%, the temporary organic binder is carboxymethyl cellulose, and the suspension has a pH approximately in the range of 6 to 7.

References Cited

UNITED STATES PATENTS

| | | | |
|---|---|---|---|
| 2,662,830 | 12/1953 | Dorlaston | 117—33.5 |
| 2,684,306 | 7/1954 | Brewer et al. | 117—33.5 |
| 2,793,137 | 5/1957 | Friedman | 117—33.5 |
| 2,905,571 | 9/1959 | Seats et al. | 117—33.5 |
| 2,951,767 | 9/1960 | Beese | 117—33.5 |
| 3,059,133 | 10/1962 | Wanmaker et al. | 117—33.5 XR |
| 3,310,418 | 3/1967 | Friedman et al. | 117—33.5 |

ALFRED L. LEAVITT, *Primary Examiner.*

W. F. CYRON, *Assistant Examiner.*

U.S. Cl. X.R.

117—97; 252—301.3